NEURISTOR STORAGE RING EMPLOYING TRIGGER-COUPLED JUNCTIONS

Filed May 27, 1965. 2 Sheets-Sheet 1

THE $T_u$ JUNCTION

INVENTOR
Alfred J. Cote, Jr.

BY [signature]

ATTORNEY

THE $T_b$ JUNCTION

THE $T_f$ JUNCTION

INVENTOR
Alfred J. Cote, Jr.

BY [signature]

ATTORNEY

United States Patent Office 3,355,717

Patented Nov. 28, 1967

3,355,717
NEURISTOR STORAGE RING EMPLOYING TRIGGER-COUPLED JUNCTIONS

Alfred J. Cote, Jr., Silver Spring, Md., assignor to the United States of America as represented by the Secretary of the Navy Filed May 27, 1965, Ser. No. 459,482
6 Claims. (Cl. 340—172.5)

ABSTRACT OF THE DISCLOSURE

A neuristor storage ring using trigger-coupled junction neuristors which are capable of sustaining attenuationless pulse propagation along their respective lengths in both directions once breakdown is caused by the application of a pulse. A pair of one way parallel path junction neuristors are located on one side of the storage ring and a one way junction neuristor is located on the other side of the ring. A source of "set" pulses coupled to the storage ring at a point near the one way junction neuristor provides pulse circulation and pulse readout. A source of clear pulses connected to one parallel path of the two parallel path junction neuristor provide circulating pulse annihilation.

Figure 1A:
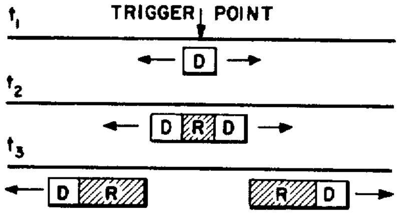

The invention described herein may be manufactured and used by or for the Government of the United States of America for governmental purposes without the payment of any royalties thereon or therefor.

The present invention relates generally to information storage and processing systems and more particularly to a simplified means for realizing storage memory capability in neuristor systems which employ only trigger coupled neuristor junctions or require a minimum use of refractory junctions. By employing a unique and novel combination of trigger-coupled neuristor junctions, the present invention provides a means for generating pulse trains of arbitrary length and, within limits imposed by neuristor parameters, arbitrary frequency.

I. *The neuristor device*

The neuristor is an active transmission line having properties similar to those of a neuron's axon. A wide variety of information processing functions can be realized by appropriately interconnecting networks of neuristors without recourse to transistors, tubes, resistors, capacitors, coils, or other electronic devices.

The neuristor is a device concept suggested by the propagation mechanism employed by the axon portion of the neuron. The axon is an active transmission line which propagates a pulse without attenuation, and the propagating pulse takes the form of a moving discharge which can be compared to the propagating flame front moving along a chemical fuze. The difference between the two, however, is that the fuze cannot be used again while the axon can support propagation for an indefinite number of times provided that it has had sufficient time to recover to its initial state before each new discharge is triggered.

If an axon is examined at one moment in time when a single pulse is propagating along its length, there will be three distinct regions in evidence. One region is the portion of the axon which the pulse has not yet reached and this portion is in a charged or standby condition. The pulse itself is at the discharged portion of the axon while the portion of the axon over which the pulse has just travelled is in an unstable or partially discharged state and this latter portion will recover to its initial or charged state after a finite time.

A better analogy to the propagating pulse of the axon is that of the spread of flame in a forest fire. The unburned forest is in a charged state prior to being ignited in flame by a lightning bolt. The discharge (flame) then spreads automatically to the charged (unburned) portion of the forest. The flame leaves in its wake a discharged (burned) region which, after a period of time (several hours), recovers to a charged state again. Only after recovery can it support a new propagation of flame. This phenomena is analogous to the essential functional features of the axon, and these features are embodied in the neuristor.

The neuristor was originally proposed by H. D. Crane and a description thereof is disclosed in Crane's article entitled: "Neuristor—A Novel Device and System Concept," Proceedings of the IRE, vol. 50, pp. 2048–2060 (October 1962). The neuristor device described in this article is a wire-like structure fabricated with appropriately distributed materials and immersed in a distributed power supply. The wire of the device proposed by Crane would maintain a standby charge distribution until triggered, at which time it would break down temporarily in the vicinity of the trigger point. The breakdown at this localized point would then spread outward in both directions along the wire, resulting in a propagating breakdown analogous to that of the axon. The recovery of the wire is referred to as the refractory phase of the process, and during this time, as with the forest fire, a discharge is not readily triggered.

Figures 2, 4:
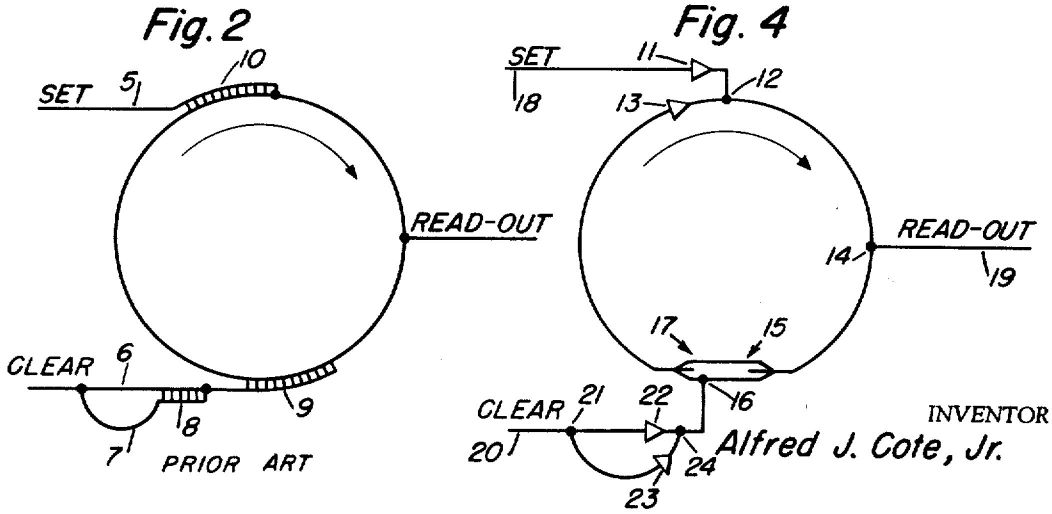

A different type of neuristor device is disclosed in copending application, Ser. No. 451,362, filed Apr. 27, 1965 of A. J. Cote, Jr., and assigned to the assignee of the present application. In FIGS. 2 and 4 of this copending application there are shown tunnel junction neuristors capable of sustaining attenuationless pulse propagation along the respective lengths thereof in both directions once breakdown is caused by the application of a pulse, as shown, at various points along the neuristor.

Although the invention to be described employs the Cote neuristor described and claimed in copending application, Ser. No. 451,362, filed Apr. 27, 1965, other neuristor devices could be substituted therefor by those skilled in the art without departing from the scope of this invention.

The various neuristor junctions and symbols therefor which were originally suggested in the aforementioned Crane article are equally descriptive of similar structural configurations of the Cote neuristor and deserve elaboration at this point. In FIG. 1A there is shown a neuristor line at various times $t_1$, $t_2$, and $t_3$. When the neuristor line is triggered at the trigger point at time $t_1$, line segment D is in a discharge state and pulse propagation to the left and right of segment D is initiated. When the discharge is propagated as shown at $t_2$, the portion of the neuristor over which propagation has just been sustained is in its refractory state as illustrated by section R of the line. At time $t_3$ a portion of the neuristor beneath the trigger point has completely recovered while portions thereof immediately behind the propagating discharge remain in a refractory state.

Figure 1B:
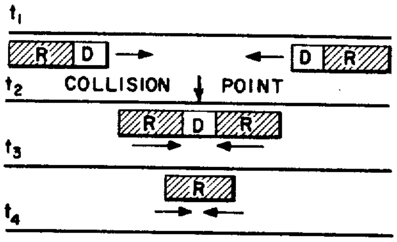

In FIG. 1B two pulses travelling toward each other are shown to collide and vanish at the point of collision, leaving the neuristor line free to sustain further propagation a finite time after the collision.

II. *The trigger and refractory junction*

Figure 1C:
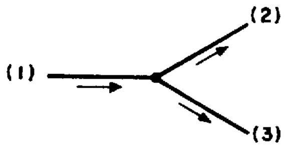
Figure 1D:
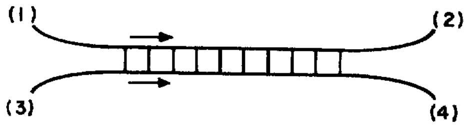

As a result of the neuristor characteristics described in FIGS. 1A and 1B, pulses can be propagated between neuristors by the trigger and refractory junctions shown in FIGS. 1C and 1D respectively. In the trigger junction in FIG. 1C, a pulse entering at 1 moves to the right and triggers similar pulses at the junction, which propagate toward 2 and 3. Since the pulse is being regenerated continually as it propagates, there is no change in pulse level at the junction of FIG. 1C.

Using the refractory junction shown in FIG. 1D, a pulse entering at 1 propagates to the right and leaves at 2 without energizing the line between 3 and 4. Similarly, a pulse entering at 3 leaves at 4 without triggering a pulse on line 1–2. However, when a pulse passes the junction on either line, it temporarily alters the conditions on the other line for a refractory period such that a pulse entering the second line during the refractory period cannot be propagated past the junction and hence dies out. For a further description of the structural arrangement of the refractory junction shown in FIG. 1D, reference should be made to the aforementioned Crane article. A realization of the functional behavior of this refractory junction is disclosed in copending application, Ser. No. 451,362, filed Apr. 27, 1965 of A. J. Cote, Jr., and assigned to the assignee of the present application.

III. *Prior art neuristor storage devices*

Using the two types of neuristor junctions shown in FIGS. 1C and 1D, neuristors can be interconnected in a variety of ways in order to process information. One particular application of the neuristors proposed by Crane in the aforementioned Crane article is the storage ring in FIG. 2 which is realized by the appropriate use of both trigger and refractory junctions. The operation of the storage ring in FIG. 2 is explained in the Crane article and will be briefly reviewed here. When a pulse is applied to the set lead 5 and reaches the storage ring via refractory junction 10, a circulating pulse on the ring is established. Each time the pulse passes the trigger junction at the three o'clock position on the ring, a pulse appears on the readout lead. The frequency of the resulting output train is related to the velocity of propagation of the pulse around the ring and the length of the ring circumference. When a pulse on the clear lead splits into a pulse pair at leads 6 and 7, each pulse survives the refractory junction 8 and arrives at a different time at the refractory junction 9 between the 5 and 6 o'clock positions on the storage ring to stop pulse circulation thereon.

The disadvantages of using refractory junctions such as those shown in FIG. 2 have been recognized by those skilled in the neuristor art. Refractory junctions are not practicably attainable in all of the various realizations of neuristors, and in view of this fact Crane has proposed a series of junction-types referred to as trigger-coupled. These are disclosed in an article by Crane entitled: "On the Complete Logic Capability and Reliability of Trigger-Coupled Neuristors," Report No. 262,198, published at the Stanford Research Institute (July 1961). The trigger-coupled junctions of interest are shown in FIGURES 3A, 3B, 3C of the application.

IV. *The trigger-coupled junctions*

Figure 3A:
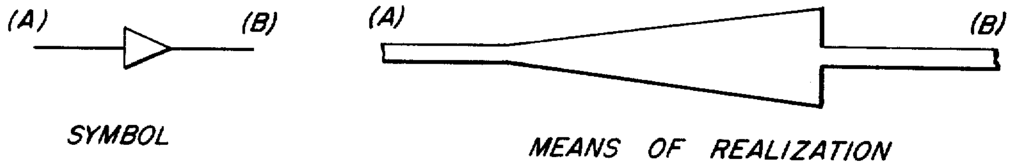

FIG. 3A illustrates the $T_u$ junction, and the means of realization shown therein represents, for example, a plan view taken at the p-n junction of the Cote neuristor disclosed in copending application, Ser. No. 451,362, filed Apr. 27, 1965. For the $T_u$ junction a pulse can move from A to B but not from B to A. The junction is realized by varying the width of the neuristor line as shown. In moving from A toward B, the transistion of the neuristor line width for the left-hand portion of the neuristor line is gradual enough to sustain pulse propagation over this portion of the line. When the line suddenly shrinks there is more than sufficient energy to insure propagation of a pulse down the narrow right-hand section of the line. However, when a pulse is applied to B, it is unable to move to A due to the sudden enlargement of the neuristor line which requires more local trigger energy than is available. The effect is similar to the fan-out limitation in a conventional computer.

Figure 3B:
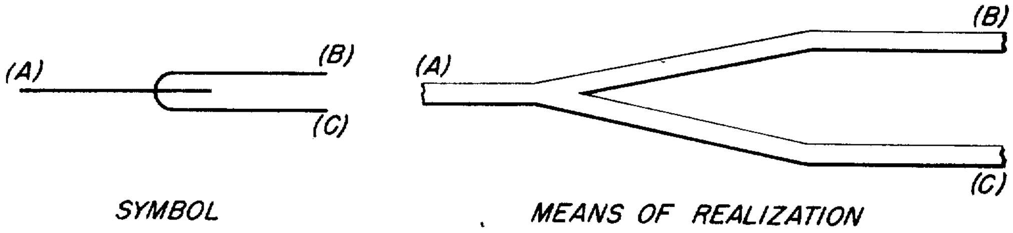
Figure 3C:
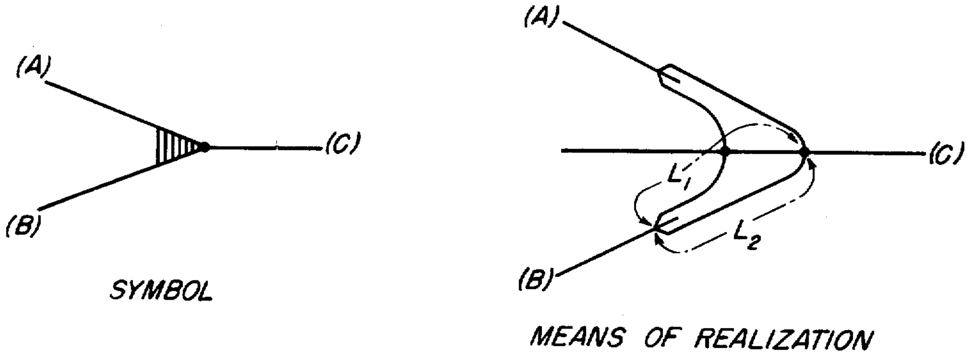

FIG. 3B illustrates the bifurcated $T_b$ junction which operates on a principle similar to the $T_u$ junction. As a pulse travels from point A to the right, the junction transition is gradual enough so that pulse propagation continues down both the B and the C paths. However, when a single pulse is applied at either B or C and propagates toward A, it encounters a transition in neuristor junction width sufficient to cause the propagation from right to left as shown in FIG. 3B to cease. If however, pulses from B and C are timed so that they will arrive at the junction simultaneously, propagation will continue past the junction toward A.

FIG. 3C illustrates the $T_f$ junction which has the following properties: A pulse entering at C will propagate to both A and B while pulses entering at either A or B will reach only C. This type of behavior is obtained using a combination of bifurcated $T_b$ junctions and trigger junctions. Since the lengths $L_1$ and $L_2$ are equal, pulses entering from C arrive at the B path bifurcated junction together and propagation continues to B. Similar considerations apply to the path links between C and A. Where, however, a pulse enters at either A or B it is unable to reach B or A, respectively, due to the fact that the two paths between A and B are unequal.

In the past trigger-coupled logic and storage networks have been designed using combinations of $T_u$ and $T_f$ neuristor junctions. This approach to neuristor network design results in the employment of an unnecessarily high number of junctions to perform relatively simple logic and storage junctions.

V. *The invention*

It is therefore an object of this invention to provide a completely new neuristor pulse storage and generating system which does not require the use of $T_f$ or refractory junctions.

It is another object of this invention to provide a neuristor pulse storage and generating system solely by controlling the geometry of the neuristor structures used therein.

It is another object of the invention to provide a completely new pulse storage and generating system which employs only $T_u$ and $T_b$ neuristor junctions.

Other objects and attendant advantages of this invention will become more readily apparent in the following description of the single embodiment thereof wherein:

FIG. 4 illustrates the neuristor pulse storage and generating system of the invention.

Briefly described, the pulse storage and generating system of the invetnion comprises a neuristor storage ring having a $T_u$ neuristor junction and a pair of $T_b$ neuristor junctions serially connected therein, said pair of $T_b$ neuristor junctions being connected together at the bifurcated sections thereof and serially connected respectively to opposite ends of said $T_u$ neuristor junctions via said storage ring. A source of set pulses is connected via another $T_u$ neuristor junction to a storage-ring T junction between said serially connected $T_u$ junction and one of said $T_b$ neuristor junctions and at a point closely adjacent to said serially connected $T_u$ junction. Unidirectional pulse circulation on the storage ring can be initiated by applying a set pulse to the ring at the last named point.

A source of clear pulses is coupled via a pulse doubling circuit to a T junction in one of the pair of paths joining the respective bifurcated sections of the serially connected $T_b$ junctions in order to enable pulse collision of ring and clear pulses on one of said paths when the termination of ring pulse circulation is desired. The collision and annihilation of the ring and clear pulses on one of said paths prevents the ring pulse travelling along the other path to survive the $T_b$ junction towards which it is travelling and thus the ring pulse circulation is stopped.

VI. *Detailed description and operation*

Referring to FIG. 4 there is shown a pulse storage ring having a $T_u$ neuristor junction 13 and a pair of $T_b$ neuristor junctions 15 and 17 serially connected therein. The $T_b$ junctions are interconnected at the bifurcated sections thereof via a pair of neuristor paths and are connected respectively to opposite sides of the $T_u$ junction 13. A source of set pulses (not shown) is connected via neuristor line 18 and $T_u$ junction 11 to the storage ring at trigger (T) junction 12 which is close to one end of the $T_u$ junction 13.

A source of clear pulses (not shown) is connected to neuristor line 20 which divides at the T junction 21 into a pair of parallel neuristor lines of different lengths, said lines being connected together at T junction 24. Each of these lines has a $T_u$ neuristor junction 22, 23 connected therein and poled in the same direction with respect to the source of clear pulses.

The T junction 24 is connected over a neuristor line to the T junction 16 in one of the paths between the pair of $T_b$ junctions 17 and 15.

When a set pulse enters the storage ring in FIG. 4 via $T_u$ junction 11 at T junction 12, both clockwise and counterclockwise pulse circulation on the ring is initiated. The pulse travelling counterclockwise on the ring is annihilated at the $T_u$ junction 13 whereas the pulse travelling clockwise survives the $T_b$ junctions 15 and 17 and continues around the ring until it reaches and survives the $T_u$ junction 13. During clockwise pulse circulation on the ring, any discharge propagated away from the storage ring toward the $T_u$ junctions 11, 22 and 23 are annihilated upon arrival at these junctions due to the unilateral conducting property of the $T_j$ junction. Similarly, pulses applied from the source of clear pulses down neuristor line 20, upon reaching T junction 24, are prevented from propagating back towards the clear pulse source due to the unilateral conducting nature of the $T_u$ junctions 22 and 23.

Upon the application of a clear pulse on line 20, a pulse pair is created at T junction 21 sending a pulse toward $T_u$ junctions 22 and 23, respectively. These pulses will arrive at T junction 16 at different times so that one of the clear pulses will either collide with the pulse circulating on the storage ring or will at least render the one of the two paths between $T_b$ junctions 17 and 15 to which the clear pulses are connected unable to sustain ring pulse propagation.

The possibility exists that the first pulse from T junction 24 will arrive at T junction 16 just after the circulating pulse passes the T junction 16 on its way to 17. This means that the first clear pulse will encounter the refractory region on the ring left by the circulating pulse and will be annihilated. However, the second clear pulse from 24 will not encounter a refractory region, but will instead be travelling between the T junction 16 and $T_b$ junction 15 the next time the circulating pulse reaches 15, assuming that the storage ring design has been properly carried out. Thus the circulating pulse travelling via the 15, 16, 17 path will be eliminated and the pulse travelling on the 15–17 path will arrive at the $T_b$ junction 17 alone will fail to survive this junction.

The length of the neuristor paths and pulse propagation velocities must be such that one of the two pulses reaching 16 from 24 will collide with the circulating pulse between junctions 16 and 15 regardless of the timing of the clear pulse. For a more complete description of some of the considerations involved in determining pulse timing, pulse propagation velocity and neuristor path lengths, reference should be made to applicant's copending application Ser. No. 451,362, filed Apr. 27, 1965 assigned to the assignee of the present application.

The time delay between the application of a set pulse at 18 and the output of the first pulse in the train at the readout line 19 is determined by the time required for a propagating pulse to travel the path 18–11–12–14–19. This time is determined by the velocity of pulse propagation along this path and the actual physical length of the path. The time between pulses in the output train is of course determined by the time required for a pulse to travel the circumference of the storage ring and this time is a function of the velocity of ring pulse propagation and the actual circumference of the path. By enlarging the circumference of the storage ring or by reducing the velocity of pulse propagation, the spacing between pulses in the output pulse train can be made arbitrarily large up to a point fixed by either space limitations and/or velocity limitations dictated by the particular form of neuristor realization being employed.

The minimum spacing between pulses in the output train is dictated primarily by the refractory time of the neuristor line or any of the junctions 13, 12, 14, 15, 16 or 17, whichever is longest. If the path 14–15–17–13–12 is made sufficiently short and depending upon the pulse propagation velocity along this path, a circulating pulse could conceivably arrive at a point which has not yet recovered from previous pulse passage past that point and thus, the circulating pulse would be self-annihilating.

The invention described above employs no refractory junctions, no $T_f$ junctions and requires a minimum number of junctions to perform the storage and pulse generating functions.

The invention employs only T, $T_u$ and $T_b$ junctions which can all be realized by choice of line geometry rather than an alteration of baisc material compositions. These junctions operate on the readily realizable trigger coupling principle.

The invention employs a new and simplified means for initiating pulse circulation on a storage ring without feedback of the circulating pulse to a source of set pulses. In addition, the invention employs a new and simplified means for generating a pair of clear pulses from a single clear input pulse applied to stop pulse circulation on the ring while simultaneously insuring that the circulating pulse is not fed back to the source of clear pulses.

In comparison to previous means for realizing neuristor storage rings using only T, $T_u$ and $T_b$ junctions, the invention employs eight fewer junctions than the total number employed in the most advanced storage ring pulse generators presently known. Additionally, the neuristor storage ring and pulse generating systems in the prior art employ up to eight, relatively velocity sensitive $T_b$ junctions whereas the invention described above employs only two $T_b$ junctions.

It should be understood that many modifications can be made to the abovedescribed illustrative embodiment of the invention without departing from the spirit and scope thereof. For example, the pulse propagation velocity on the nonjunction portions of the structure need not be the same everywhere. Thus, the pulse propagation velocity on the path between 14 and 19 need not be the same as the velocity on the path between 17 and 13 as long as the path lengths provide the proper timing relationship for the specific neuristor structural design being carried out.

The spacing between junctions can be altered; thus as an example, junctions 14 and 12 could be brought closer together.

Other sequences of junctions around the ring are possible; for example, junction 14 could be placed between junctions 17 and 13. However, if junction 14 were placed between junctions 13 and 12, one extra pulse would occur due to the initial counterclockwise circulation of the pulse from junction 12 when the set lead is energized.

The storage ring could be designed for counterclockwise circulation if desired and one approach to such design would be to reverse the direction of the $T_u$ junction at 13 and place it between junctions 12 and 14, close to junction 12.

If advantageous for any reason, portions of the structure could be replaced by other junction types. For example, the junction group 15, 16, 17 could be replaced by a refractory junction, while other junctions remain unchanged provided that minor changes in path lengths and pulse propagation velocities are modified to accommodate the design alterations.

Therefore, it should be understood that the invention may be practiced otherwise than as specifically described without departing from the spirit and scope of the following appended claims.

I claim:

1. A pulse storage and generating system comprising (a) a neuristor storage ring having a $T_u$ neuristor junction and a pair of $T_b$ neuristor junctions serially connected therein, said pair of $T_b$ neuristor junctions connected together via a pair of neuristor paths at the bifurcated sections thereof and connected respectively to opposite ends of said $T_u$ neuristor junction via said storage ring, (b) pulse train initiating means connected between said $T_u$ junction and one of said pair of $T_b$ neuristor junctions for providing a circulating pulse on said storage ring, and (c) means connected to one of said pair of neuristor paths between said $T_b$ neuristor junctions for annihilating a pulse on said one path and inhibiting pulse circulation on said storage ring.

2. The system of claim 1 wherein (a) said pulse train initiating means includes a $T_u$ neuristor junction connected between a source of set pulses and said storage ring.

3. The system of claim 1 wherein said means for annihilating includes (a) a pair of $T_u$ neuristor junctions located respectively in parallel connected neuristor paths of different lengths between a source of clear pulses and said one path between said $T_b$ junctions, said parallel connected paths being joined together and to said one path between $T_b$ junctions via a T-junction whereby a pair of annihilating pulses are derived from each clear pulse applied to said parallel connected paths.

4. The system of claim 3 wherein:

(a) said pulse train initiating means includes a $T_u$ neuristor junction connected between a source of set pulses and a T-junction on said storage ring.

5. The system of claim 4 wherein:

(a) said last named T junction is connected sufficiently close to said serially connected $T_u$ junction in said storage ring for substantially inhibiting bi-directional pulse circulation on said ring.

6. The system of claim 5 wherein:

(a) said pair of paths between said serially connected $T_b$ junctions are substantially equal in length, (b) said serially connected $T_u$ junction and said $T_u$ junction connected to said source of set pulses being oppositely poled with respect to said source of set pulses, and (c) said pair of parallel connected $T_u$ junctions being like poled with respect to said source of clear pulses whereby unidirectional pulse transmission from said set and clear pulse sources to said storage ring is insured.

References Cited

UNITED STATES PATENTS 3,238,504 3/1966 Crane ............ 340—172.5

OTHER REFERENCES

H. D. Crane: Neuristor—A Novel Device and System Concept, Proceedings of the IRE, October 1962, pp. 2048 to 2060.

PAUL J. HENON, *Primary Examiner.*